United States Patent [19]

Nafziger et al.

[11] Patent Number: 4,552,902
[45] Date of Patent: Nov. 12, 1985

[54] PROCESS FOR PREPARING STABLE SOLUTIONS OF TRIMERIZED ISOCYANATES IN MONOMERIC POLYISOCYANATES

[75] Inventors: John L. Nafziger, Lake Jackson; Mark A. Snyder, Angleton; Larry W. Mobley, Lake Jackson, all of Tex.

[73] Assignee: The Dow Chemical Company, Midland, Mich.

[21] Appl. No.: 685,269

[22] Filed: Dec. 24, 1984

[51] Int. Cl.[4] .................. C08G 18/14; C08G 18/18
[52] U.S. Cl. ............................. 521/129; 252/182; 521/160; 521/902; 521/137; 528/67; 528/73
[58] Field of Search ............... 521/129, 902, 160, 160; 528/73, 67; 252/182

[56] References Cited

U.S. PATENT DOCUMENTS 3,621,020  11/1971  Ojakaar ........................... 521/129
4,310,632  1/1982   Horacek et al. ................. 521/129
4,382,125  5/1983   Narayan et al. ................. 521/160
4,395,530  7/1983   Hammond ......................... 528/48
4,456,709  6/1984   Richter et al. ................. 521/160

FOREIGN PATENT DOCUMENTS 1337659  11/1973  United Kingdom .

Primary Examiner—Herbert S. Cockeram
Attorney, Agent, or Firm—G. C. Cohn

[57] ABSTRACT

Trimerized isocyanates having improved solubility in polyisocyanates are prepared by reacting a polyisocyanate with a low equivalent weight polyol to form a first prepolymer, forming a cotrimer from said first prepolymer by reaction of same with diphenylmethane diisocyanate or polymeric derivatives thereof, and forming a second isocyanate terminated prepolymer by reacting said cotrimer with a second low equivalent weight polyol. The resulting cotrimer can be diluted in a polyisocyanate and used to prepare polymers, particularly polyurethane foams, having excellent properties.

11 Claims, No Drawings

PROCESS FOR PREPARING STABLE SOLUTIONS OF TRIMERIZED ISOCYANATES IN MONOMERIC POLYISOCYANATES

BACKGROUND OF THE INVENTION

In the preparation of urethane-type polymers by reacting a polyisocyanate with an active hydrogen containing compound, it is known that the incorporation of trimerized isocyanate into the polymer can provide it with beneficial properties such as flame resistance, high tensile strength and flexural modulus. In flexible polymeric foams the use of a trimerized isocyanate can improve the compression set and indentation force deflection obtained.

A significant problem with the use of trimerized isocyanates is that the trimer is insoluble in the isocyanate used in preparing the polymer. Thus it is difficult to prepare and store trimerized isocyanates for use in preparing polymers. Also, it is difficult to uniformly disperse the trimer throughout the polymer due to its insolubility in the polyisocyanate.

In U.K. Pat. No. 1,337,659 it is taught to prepare solutions of trimerized isocyanates in a polyisocyanate by reacting a polyisocyanate with a short chain polyol, partially trimerizing the resulting prepolymer and diluting the product with additional polyisocyanate. Among the trimers disclosed in the patent is one prepared by cotrimerizing 4,4'-diphenylmethane diisocyanate (MDI) and toluene diisocyanate (TDI). Although improved solubility of the trimer in a polyisocyanate is achieved in this manner, it would be desirable to further improve the solubility of a trimerized isocyanate in a polyisocyanate.

SUMMARY OF THE INVENTION

This invention comprises a process for preparing a trimerized isocyanate having improved solubility in a polyisocyanate. The process of this invention comprises the steps of (a) forming a first isocyanate-terminated prepolymer by reacting a first low equivalent weight polyahl with a stoichiometric excess of a polyisocyanate, (b) forming a cotrimer by reacting said first isocyanate terminated prepolymer with diphenylmethane diisocyanate or polymeric derivative thereof in the presence of a trimerization catalyst and (c) reacting a stoichiometric excess of said cotrimer with a second low equivalent weight polyahl to form a second isocyanate-terminated prepolymer.

The trimerized isocyanate of this invention exhibits surprisingly good solubility in polyisocyanates, thereby substantially increasing the ease of their use to prepare polyurethanes. Polyurethane polymers, in particular flexible polymer foams, prepared from said trimerized isocyanate also exhibit surprisingly good properties such as a good compression set and a high guide factor.

DETAILED DESCRIPTION OF THE INVENTION

In the process of this invention, a polyisocyanate is reacted with a first low equivalent weight polyahl to form a first isocyanate-terminated prepolymer. The polyisocyanate is employed in a stoichiometric excess so that the reaction product is isocyanate-terminated. Generally, about 5 to 40, preferably about 10 to 20 equivalents of polyisocyanate are used per equivalent of low equivalent weight polyahl in preparing the first prepolymer.

The reaction conditions employed are such that substantially all of the low equivalent weight polyahl is reacted with the polyisocyanate. Reaction conditions typically used in preparing polyurethanes from polyahls and polyisocyanates are useful to form the first prepolymer. Typically, ambient or a mildly elevated temperatures such as about 0° to 100° C., preferably 50° to 70° C. are employed to conduct the reaction. Typically, the reactants are blended at an elevated temperature to cause the polyisocyanate, which is often a solid, to melt in the polyahl. Although a urethane catalyst such as an organotin compound or a tertiary amine may be used, it is preferred to omit such catalyst. The time required for the prepolymer-forming reaction varies with the reaction temperature but typically requires from about 30 seconds to 2 hours.

The polyisocyanate used in forming the first prepolymer generally contains from about 2 to 4, preferably about 2-3 isocyanate moieties per molecule. Both aliphatic and aromatic polyisocyanates are useful herein. Suitable polyisocyanates include hexamethylene diisocyanate, 1,3- or 1,4-cyclohexane diisocyanate, isophorone diisocyanate, halogenated diphenylmethane diisocyanate (2,4'- and/or 4,4'-isomers) or polymeric derivatives thereof, toluene diisocyanate (2,4- and/or 2,6-isomers), m- or p-xylene diisocyanate and phenyl diisocyanate and the like. Preferred are the aromatic polyisocyanates, especially the isomers of toluene diisocyanate and phenyl diisocyanate. Diphenylmethane diisocyanate and polymeric derivatives thereof are not preferred in preparing the first prepolymer.

The first low equivalent weight polyahl advantageously has about 2 to 4, preferably about 2 active hydrogen atoms per molecule. The term "polyahl" is used herein to describe any compound having a plurality of hydrogen atoms displaying significant activity according to the Zerewitnoff test describd by Koller in the *Journal of the American Chemical Society*, Vol. 49 page 3181 (1927). Such polyahls include polyols, polyamines, polymercaptans, polyacids and the like. Preferred on the basis of cost and availability are polyamines and especially polyols. The preferred polyols have an average functionality of about 2 to 4, preferably about 2 and an equivalent weight of about 25 to 250. Exemplary polyahls include propylene glycol, neopentyl glycol, dipropylene glycol, tripropylene glycol, 1,4 butane diol, ethylene glycol, ethylene diamine, diethylene triamine and the like. Preferred, due to the increased solubility of the product trimerized isocyanate prepared therewith, are propylene glycol, dipropylene glycol, dibromoneopentyl glycol and mixtures thereof. Dipropylene glycol is most preferred.

Following the preparation of the first isocyanate-terminated prepolymer, it is added to a diphenylmethane diisocyanate (MDI) and/or polymeric derivative thereof and the resulting mixture trimerized. Preferred are MDI itself and polymeric derivatives thereof having an average functionality greater than about 2.5, preferably about 2.6–3.5, since these materials provide flexible polymeric foams having particularly good compression sets. Derivative thereof having inert substituents such as alkyl, halogen or alkoxyl groups are also useful herein. Generally, about 4 to about 400, preferably about 9 to 250, more preferably about 25 to 156 parts by weight of the MDI or polymeric derivative thereof are used per 100 parts by weight of the polyisocyanate used to prepare the first prepolymer. Fewer than about 4 parts fails to provide any significant benefit and greater than about 400 parts tend to produce a less soluble cotrimer. Solubility is maximized when the preferred amounts of the diphenylmethane diisocyanate or polymeric derivative thereof are used.

The trimerization reaction is generally conducted at an elevated temperature, i.e. about 30° to 120° C., preferably from about 45° to 90° C., for a period of about 30 minutes to about 25 hours. The temperature and time of the reaction may vary somewhat according to the amount of the trimerization desired. Trimerization is favored by longer reaction times and higher temperatures.

The trimerization is advantageously conducted in the presence of a trimerization catalyst. Many catalysts for the trimerization of isocyanates are known and these are generally useful herein. However, certain catalysts such as those substituted guanidines and isobisguanidines described in U.S. Pat. No. 3,621,020 (incorporated herein by reference) are preferred. Tetramethyl guanidine is especially preferred. These catalysts produce a significantly more soluble cotrimer than other trimerization catalysts.

The trimerization catalyst can be used in a conventional amount such as from about 0.0001 to about 0.02 equivalent per equivalent of isocyanate present in the mixture to be trimerized.

Following the trimerization reaction it is advantageous to stop the reaction by the addition of an acidic material which is soluble in the reaction mixture, such as an organic acid or acid halide. Benzoyl chloride is especially suitable for this purpose.

Generally, some dimerized isocyanates are formed during the trimerization reaction. These are advantageously cracked back to monomeric isocyanates by heating the mixture to about 120° to 200° C. in the substantial absence of a trimerization catalyst. The cracking of dimer is accompanied by a decrease in refractive index. The cracking reaction is therefore advantageously carried out until the refractive index reaches a constant value or begins to increase.

The product of the trimerization reaction generally comprises a mixture of trimerized species, including homotrimers of MDI or the other polyisocyanate employed, as well as various cotrimers thereof. All such species are refered to collectively herein as the "cotrimer".

The cotrimer is then reacted with a second low equivalent weight polyahl to form a second isocyanate-terminated prepolymer. The conditions of this reaction are generally as described with respect to the formation of the first prepolymer. Generally from about 0.01 to about 0.5, preferably about 0.03 to about 0.15 equivalents of the second low equivalent weight polyahl are reacted per isocyanate equivalent in the cotrimer to form the second prepolymer.

In forming the second prepolymer the preferred polyahls are propylene glycol, tripropylene glycol, dipropylene glycol, dibromoneopentyl glycol, neopentyl glycol, low equivalent weight polypropylene oxide or polyethylene oxide diols and triols, 1,4 butane diol and other low equivalent weight polyols. This second prepolymer advantageously has a trimer content of about 10 to 70, preferably about 25 to 60 percent by weight.

After forming the second prepolymer it is advantageously but not necessarily diluted with a monomeric polyisocyanate. After dilution the product advantageously contains about 3 to 50 percent, preferably 8 to 30 percent, more preferably 10 to 15 percent by weight trimer. At higher levels, foams prepared from the cotrimer solutions tend to collapse. Within the preferred ranges the desirable properties of elongation, flame resistance and guide factor are maximized in foams prepared from the cotrimer solutions.

The cotrimer prepared according to this invention is useful in the preparation of polyurethane polymers, particularly polymeric foams. Flexible polymeric foams prepared from the cotrimer of this invention often exhibit surprisingly good guide factors and compression sets particularly when reacted with a copolymer polyol to form the foam. Methods for preparing polyurethane foams using the cotrimer of this invention are described in the copending application Ser. No. 685,290 of Nafziger et al. entitled "Flexible Polyurethane Foams Prepared From Cotrimers of Alkylene Bridged-Polyphenylene Polyisocyanates" filed Dec. 24, 1984.

The cotrimer solutions of this invention can also be used to prepare non-cellular polyurethane and/or polyurea materials, which can be either flexible or rigid.

The following examples are provided to illustrate the invention but are not intended to limit the scope thereof. All parts and percentages are by weight unless otherwise indicated.

The following general procedure is used in the examples to prepare cotrimer solutions according to this invention. The particular types and amounts of each component used in the individual examples, when variable, are indicated in the specific examples. Likewise, the time and temperature of the trimerization reactions are as indicated in the specific examples.

A portion of an 80/20 mixture of the 2,4- and 2,6-isomers of toluene diisocyanate (TDI) is reacted with a quantity of a first polyol at 55° to 70° C. until the reaction is essentially complete. Then a portion of MDI (predominantly 4,4'-isomer) and about 0.005 to about 0.0015 equivalents of tetramethyl guanidine per equivalent of isocyanate are added. The mixture is then trimerized at the temperature and for the time indicated in the specific examples. The trimerization reaction is stopped by the addition of benzoyl chloride (a 10% excess based on tetramethylguanidine). The resulting cotrimer is then heated to 140° to 160° C. for 2 to 6 hours to crack any dimers formed in the trimerization reaction back to monomeric polyisocyanate. The resulting product is cooled to 80° C. and to it is added a second polyol as indicated in the various examples. The mixture is heated at 80° C. for 1 hour to form a second isocyanate-terminated prepolymer which is cooled and diluted in toluene diisocyanate until the product cotrimer solution has an isocyanate content of about 39.5% by weight.

EXAMPLES 1–4

Examples 1–4 are all prepared using dipropylene glycol as a first polyol. The second polyol is dibromoneopentyl glycol in Examples 1 and 2 and neopentyl glycol in Examples 3 and 4. The amounts of TDI, MDI and polyols used as well as the conditions for the trimerization reaction are indicated in Table I.

TABLE I

| | Example Numbers | | | |
|---|---|---|---|---|
| | 1 | 2 | 3 | 4 |
| TDI[1] (grams) | 500 | 500 | 1000 | 1000 |
| Dipropylene glycol[1] (g) | 24.8 | 24.8 | 49.6 | 49.6 |

TABLE I-continued

| | Example Numbers | | | |
|---|---|---|---|---|
| | 1 | 2 | 3 | 4 |
| MDI (g) | 710 | 710 | 250 | 250 |
| Trimerization Time (hr) | 16 | 2.2 | 16 | 4.5 |
| Trimerization Temp. °C. | 45 | 70 | 45 | 70 |
| DBNPG[2] | 85.4 | 85.4 | 0 | 0 |
| NPG[3] | 0 | 0 | 40.5 | 40.5 |
| TDI[4] (Diluent) (g) | 2316 | 1744 | 1943 | 1306 |
| % trimer[5] | 22.0 | 15.0 | 19.3 | 13.6 |
| % NCO[5] | 39.4 | 39.5 | 39.4 | 39.5 |

[1]Amount of toluene diisocyanate or dipropylene glycol used to prepare first prepolymer.
[2]DBNPG = dibromoneopentyl glycol
[3]NPG = neopentyl glycol
[4]Amount of TDI used to dilute second prepolymer.
[5]Weight percent in diluted product.

In each of Example Nos. 1–4, a highly stable cotrimer solution is prepared. A flexible foam is prepared from each of cotrimer solutions Examples 1–4. The "B" side composition employed in each case is prepared by stirring together 316 grams of a 4800 molecular weight ethylene oxide-capped poly(propylene oxide)triol, 212 grams of a 22% solids dispersion of styrene/acrylonitrile (52% MW) in a 4800 molecular weight ethylene oxide-capped poly(propylene oxide)triol, 22.1 g distilled water, 13.7 grams of a silicone surfactant and 11.3 grams of amine catalyst. Sufficient of the cotrimer solution to provide a 100 index is then added and the mixture poured into a 15×15×4½" mold which is preheated to 135° F. The foam is allowed to rise for 2 minutes and then cured for an additional 4 minutes at 250° F. In each case a good quality foam having an excellent guide factor is obtained.

EXAMPLES 5–8

Cotrimer solution Examples 5–8 and Comparative Sample Numbers A and B are prepared using dipropylene glycol as a first polyol and neopentyl glycol as a second polyol. In Comparative Sample Number A no first polyol is used, and no second polyol is used in Comparative Sample No. B. Table II sets out the amounts of each component and the trimerization conditions used in preparing the examples and comparative samples.

Each of cotrimer solution Example Nos. 5–8 is a stable solution. However, the omission of either the first or second diol causes comparative sample numbers A and B to be cloudy and contain some precipitated trimers.

Foams prepared from each of Example Nos. 5–8 have excellent properties.

TABLE II

| | Example Numbers | | | | | |
|---|---|---|---|---|---|---|
| | 5 | 6 | 7 | 8 | A | B |
| TDI[1] (grams) | 1000 | 1000 | 1000 | 1000 | 1000 | 1000 |
| Dipropylene glycol[1] (g) | 49.6 | 49.6 | 24.8 | 99.2 | 49.6 | 0 |
| MDI (g) | 250 | 250 | 250 | 250 | 250 | 250 |
| Trimerization Time (hr) | 16 | 16 | 19 | 16 | 9 | 16 |
| Trimerization Temp. °C. | 45 | 45 | 70 | 45 | 45 | 45 |
| NPG[2] (g) | 20.2 | 40.5 | 40.5 | 40.5 | 0 | 40 |
| TDI[3] (Diluent) (g) | 1943 | 1943 | 1942 | 1943 | 1368 | 882 |
| % trimer[4] | 19.4 | 19.3 | N.D. | 19.3 | N.D. | N.D. |
| % NCO[4] | 40.05 | 39.4 | 38.9 | 39.4 | 39.4 | 39.6 |

[1]Amount of toluene diisocyanate or dipropylene glycol used to prepare first prepolymer.
[2]NPG = neopentyl glycol
[3]Amount of TDI used to dilute second prepolymer.
[4]Weight percent in diluted product.

EXAMPLES 9 AND 10

Examples 9 and 10 are prepared using dipropylene glycol as the first polyol and various polyols as the second polyol. The amounts of TDI and MDI and polyols used as well as the conditions for trimerization reaction are included in Table III. In each case a stable cotrimer solution is formed which prepares excellent foams.

TABLE III

| | Example Number | |
|---|---|---|
| | 9 | 10 |
| TDI[1] grams | 500 | 500 |
| DPG[1] (g) | 24.3 | 25 |
| MDI (g) | 710 | 710 |
| Trimerization Time (hr) | 16 | 18 |
| Trimerization Temp. (°C.) | 45 | 45 |
| 1,4-Butane Diol[2] | 29.4 | 0 |
| 4.7 functional polyol[3] | 0 | 82 |
| TDI[4] (Diluent) | 1634 | 930.7 |
| % Trimer[5] | 15.8 | 15.8 |
| % NCO[5] | 39.5 | 39.4 |

[1]Amount of toluene diisocyanate or dipropylene glycol used to prepare first prepolymer.
[2]Second polyol.
[3]A 126 equivalent weight polypropylene oxide having an average functionality of about 4.7.
[4]Amount of TDI used to dilute second prepolymer.
[5]Weight percent in diluted product.

What is claimed is:

1. A process for preparing a trimerized isocyanate having improved solubility in a polyisocyanate, which process comprises the steps of (a) forming a first isocyanate terminated prepolymer by reacting a first low equivalent weight polyahl and a stoichiometric excess of a first polyisocyanate, (b) forming a cotrimer by reacting said first isocyanate-terminated prepolymer with a diphenylmethane diisocyanate or polymeric derivative thereof or mixtures thereof in the presence of a trimerization catalyst and (c) reacting a stoichiometric excess of said cotrimer with a second low equivalent weight polyol to form a second isocyanate-terminated prepolymer.

2. The process of claim 1 wherein said first polyol comprises a 1,2-propylene glycol, dipropylene glycol, dibromoneopentyl glycol or mixtures thereof.

3. The process of claim 2 wherein said first polyisocyanate comprises 2,4-toluene diisocyanate, 2,6-toluene diisocyanate, phenyl diisocyanate or mixtures thereof.

4. The process of claim 3 wherein the trimerization catalyst comprises a substituted guanidine or an isobisquanidine.

5. The process of claim 4 wherein the second polyol has a functionality of about 2 to 8 and an equivalent weight of less than 400.

6. The process of claim 5 further comprising diluting said second isocyanate-terminated prepolymer with a polyisocyanate.

7. The process of claim 6 wherein said second isocyanate-terminated prepolymer contains about 25 to 60 percent by weight of trimerized isocyanates before dilution with monomeric polyisocyanates.

8. The process of claim 6 wherein the diluted second isocyanate terminated prepolymer contains 10 to 15 percent by weight of trimerized isocyanates.

9. The process of claim 7 wherein the second isocyanate terminated prepolymer comprises about 30 to 50 percent of the weight of the diluted isocyanate terminated prepolymer.

10. The process of claim 3 wherein said first polyisocyanate is 2,4-toluene diisocyanate, 2,6-toluene diisocyanate or a mixture thereof and about 25 to 156 parts by weight of diphenylmethane diisocyanate are reacted with said first isocyanate-terminated prepolymer per 100 parts of said first polyisocyanate employed in preparing said first isocyanate-terminated prepolymer.

11. The process of claim 9 wherein the trimerization catalyst comprises tetramethyl guanidine.

* * * * *